United States Patent
Howard, Jr. et al.

(10) Patent No.: US 6,256,622 B1
(45) Date of Patent: Jul. 3, 2001

(54) LOGICAL DIVISION OF FILES INTO MULTIPLE ARTICLES FOR SEARCH AND RETRIEVAL

(75) Inventors: Albert R. Howard, Jr., Fremont; Richard Hoiberg, Gilroy; Curtis Stevens, Sunnyvale; Daniel Rose, Cupertino, all of CA (US); Michael Monan, Ann Arbor, MI (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/063,378

(22) Filed: Apr. 21, 1998

(51) Int. Cl.[7] ................................................. G06F 17/30
(52) U.S. Cl. .......................... 707/3; 707/1; 707/2; 707/4; 707/5; 707/6; 707/7; 707/10; 707/104
(58) Field of Search ................................. 707/1, 2, 3, 4, 707/5, 6, 7, 10, 104; 345/440

(56) References Cited

U.S. PATENT DOCUMENTS

| | | | | |
|---|---|---|---|---|
| 5,504,891 | * | 4/1996 | Motoyama | 707/1 |
| 5,625,767 | * | 4/1997 | Bartell | 395/140 |
| 5,737,619 | * | 4/1998 | Judson | 395/761 |
| 5,873,076 | * | 2/1999 | Barr | 707/3 |
| 5,903,892 | * | 5/1999 | Hoffert | 707/10 |
| 5,907,840 | * | 5/1999 | Evans | 707/5 |
| 5,918,236 | * | 6/1999 | Wical | 707/500 |
| 5,933,145 | * | 8/1999 | Meek | 345/348 |
| 5,983,176 | * | 11/1999 | Hoffert | 704/233 |

OTHER PUBLICATIONS

IEEE publication—Merging thesauri: principles and evaluation by H. Mili et al., vol. 10(2), pp. 204–220, Mar. 1998.*
IEEE Publication Assessing Document Relevance with Run–Time Reconfigurable Machines by B. Gunther, pp. 10–17.*

* cited by examiner

Primary Examiner—Thomas Black
Assistant Examiner—Diane D. Mizrahi
(74) Attorney, Agent, or Firm—Burns, Doane, Swecker & Mathis, L.L.P.

(57) ABSTRACT

A single file, such as an HTML document, is logically divided into multiple articles that can be individually recognized and ranked by search engines. The segmentation of a document into separate articles is based upon tokens that are used in document mark-up languages. In addition to the tokens which delineate articles from one another, additional tokens, or tags, are used to create a named location for each article, so that a browser can immediately display an article within a document that is relevant to a search query.

21 Claims, 5 Drawing Sheets

LOGICAL DIVISION OF FILES INTO MULTIPLE ARTICLES FOR SEARCH AND RETRIEVAL

FIELD OF THE INVENTION

The present invention is generally directed to the retrieval of information from electronic documents, and more particularly to a method and system for logically dividing and resolving a single document, or similar type of file, into multiple articles for analysis and presentation by a search engine.

BACKGROUND OF THE INVENTION

As the use of computers to create and manage all types of data continues to grow, the ability to access and retrieve information on a particular topic rapidly becomes unmanageable. This phenomenon is evident within organizations of all sizes, and is particularly noticeable in environments where the sources of information are potentially infinite. With its vast array of computers that are inter-connected around the world, the internet best exemplifies this problem. To permit users to easily locate sources of relevant information, therefore, the use of search engines has become almost ubiquitous.

In general, two types of search engines are employed to find relevant data that could be located in a variety of places. One type of search engine analyzes and indexes the contents of the various information sources before a search is conducted. When a user requests a search on a particular topic, the search engine only needs to refer to the index in order to quickly locate relevant documents and the like. The other type of search engine analyzes the contents of the information sources at the time that the search is being conducted. Although this type of search engine exhibits slower performance, because the available information is not preprocessed, it has the capability to return more current information in an environment where the data is being updated on a relatively frequent basis.

Typically, either type of search engine functions to retrieve all documents or files that match criteria specified by the user. Depending upon the capabilities of the search engine, it may return only those documents which exactly match the criteria that has been specified, or it may return a larger collection of documents which are equivalent to, or otherwise related to, the documents that exactly match the search criteria.

In many situations, the number of documents which meet the user's request can be quite voluminous. For instance, a typical search that is conducted on the internet might return hundreds, or even thousands, of "hits", i.e., documents which match the user's search criteria. To assist the user in reviewing these documents, therefore, many search engines attempt to rank them according to their relevance.

One particular technique that is commonly used to rank documents relies upon the frequency of occurrence of criteria-matching information within a document. For instance, the number of times that a user-specified term appears in a given document can be compared to the total number of words in the document, to determine a relevance ratio. Using this approach, a single-page document in which the user-specified term appears several times will have a much higher ranking than a multi-page document in which the user-specified term appears only once or twice. After the relevance of each of the retrieved documents is determined, using such an approach, they are presented to the user in a manner indicative of their respective relevance rankings.

While this approach to the searching and presentation of documents assists the user in sorting through vast amounts of information, it does not always present the user with the information that is most relevant to his or her request. For example, a large document might contain an entire section that is devoted to the specific topic in which a user is interested. However, if that section forms only a small portion of the overall document, its relevance ranking could end up being relatively low. If the user operates on the assumption that only the most highly ranked documents presented by the search engine are likely to be of real interest, he or she may never get to the document which is, in fact, right on point.

Typically, users view the results of a search through some form of browser, which enables them to navigate between each of the documents that was located during the search. When the user selects a particular document from the list of those which have been retrieved, the browser displays the beginning of the document, normally the top half of the first page. Based upon the information contained in this displayed portion, the user may decide to look further into the document, or proceed to the next document that turned up in the search.

As is very often the case, the portion of a document which is relevant to a user's inquiry may not be evident from viewing the top half of the first page. This situation is particularly evident in an example of the type described above, in which a large document may contain an entire section devoted to the particular topic of interest. If that section is buried deep in the document, the user may never take the time to scan far enough into the document to discover this fact. Consequently, the user may end up missing the very document which is most relevant to his or her inquiry.

Accordingly, it is desirable to provide a system for searching and retrieving documents which is capable of identifying the portions of documents that are truly relevant to a user's request, regardless of the size of the document. Further along these lines, it is desirable to provide such a system in which the relevant portion of the document is immediately displayed to the user, thereby alleviating the user of the need to take the time to scan through voluminous documents to determine their possible relevance.

SUMMARY OF THE INVENTION

In accordance with the present invention, these objectives are achieved by logically dividing and resolving a single file, such as a single document, into multiple articles that can be individually recognized and ranked by search engines. Using this approach, the search engine is able to separately evaluate each of several articles within a file, to determine whether they meet the criteria for a given search. Each article can be separately provided to the user with an indication of its particular relevance to the search criteria, as well as the relevance of the document as a whole.

In one embodiment of the invention, the segmentation of a document into separate articles is based upon standard tokens that are used in document mark-up languages. An example of such a token is a particular level of header tag that is employed in HTML documents. Whenever such a token is encountered, the portion of the document which follows the token is considered to be a new article. Using this approach, currently existing documents which use standard mark-up language techniques can be readily divided into articles, without any modification thereof.

In a further embodiment of the invention, a unique marker is inserted at the beginning and end of each article in the document. The search engine can employ these markers to delineate the various articles from one another. As a further feature, additional markers can be included within each article, to assist in the navigation of the document. If a particular article meets the criteria for a given search, and the user provides an indication that he or she wishes to view the article, the additional marker can cause the browser to immediately display the beginning of the article, rather than the first page of the document in which the article may be embedded. Using this approach, therefore, the author of the document can be explicit in the designation of the parts which represent separate articles, and the user can be instantly provided with the relevant information, thereby avoiding the need to scan through lengthy documents.

Further features of the invention, and the advantages provided thereby, are discussed in detail hereinafter with reference to particular embodiments illustrated in the accompanying drawings.

DETAILED DESCRIPTION

The present invention is applicable to a variety of different information retrieval environments, of the type in which the contents of files are examined to determine whether they contain information that is relevant to a particular user's inquiry. In the context of the present invention, a "file" which contains information of possible interest can be a single document, a web page, or a collection of documents which are assembled into a unit that is searched and retrieved as a distinct entity.

The retrieval of information regarding a particular topic of interest is accomplished by means of a search engine. Although a search engine does not form part of the invention itself, a discussion of the general operation of a search engine will be provided, to facilitate an understanding of the principles which underlie the invention. In general, search engines fall into two basic categories, namely those which search the files in real time, and those which pre-analyze the files to expedite the search process. Typically, a real-time search engine is employed in those situations where the number of files to be searched is confined. For instance, a real-time search engine might be employed to locate records within a database, or to search the files stored on a single company's network server. In those situations where the volume and/or sources of information are potentially unbounded, it is more practical to employ a search engine which analyzes the information and constructs an index prior to the time that a search is actually carried out.

Figure 1:
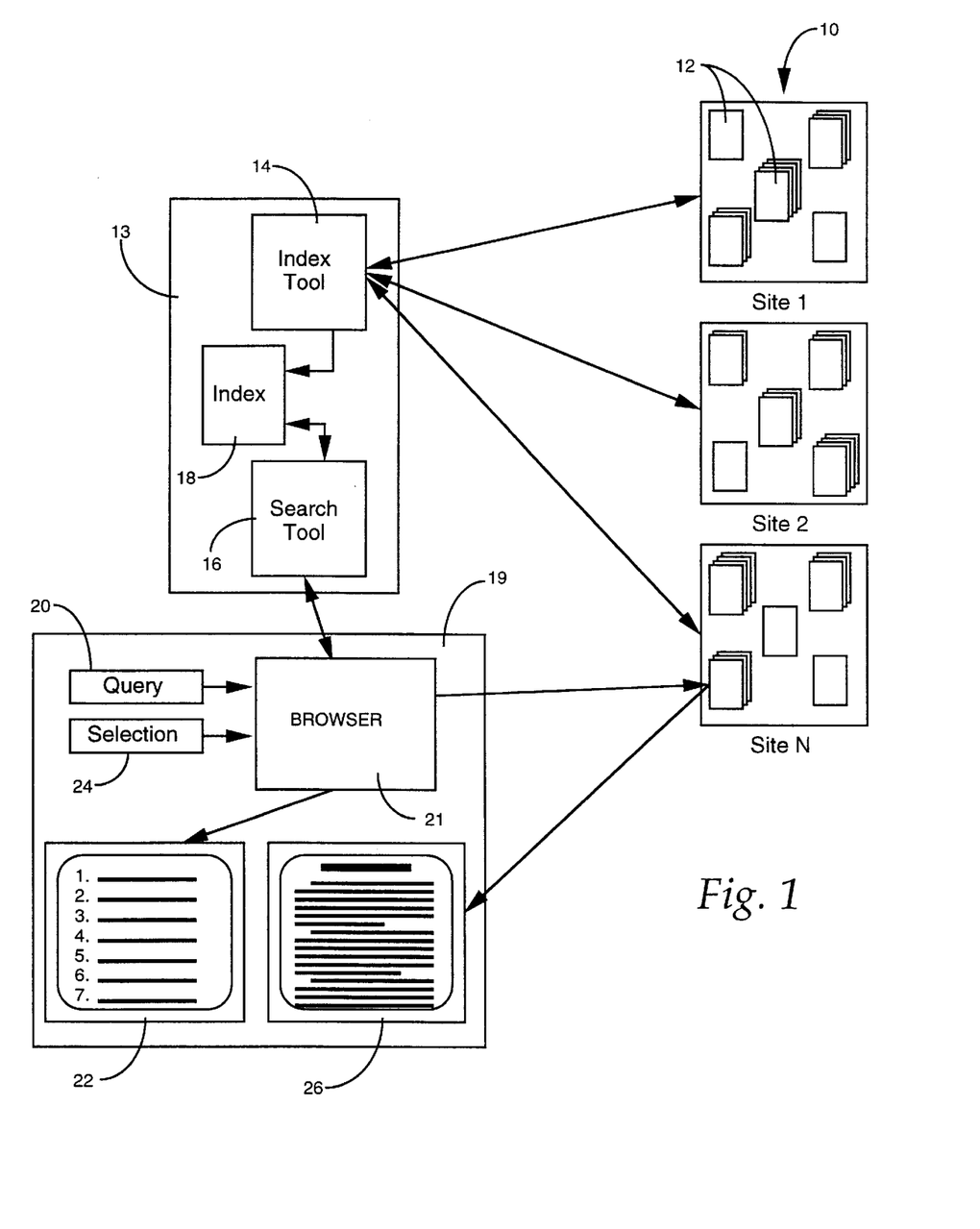
FIG. 1 is a general block diagram illustrating the operation of a search engine.

FIG. 1 illustrates an example of a search environment which employs this latter type of approach. The search engine is configured to work within a particular universe of information sources. For example, the information sources could comprise some or all of the web sites 10 that constitute the world wide web on the internet. Typically, each web site is serviced by one or more computers, e.g. network servers. Each web page 12 that is stored in the memory of the computers at these sites constitutes a data file, or document, that contains potentially relevant information for a given user. In this particular example, each file has a format which conforms to a mark-up language, such as the Hyper Text Mark-Up Language (HTML), or the like. In essence, the mark-up language includes codes that instruct a computer how to format a document on a printer or display it on a monitor. The use of these languages is particularly advantageous in such an environment because they permit the files to be platform independent, and therefore easily portable between different applications.

A search engine which is designed to locate documents and other data files of possible interest in such an environment typically runs on a computer 13, such as a network server, which has access to the web sites of interest. The search engine contains two major components, an indexing tool 14 and a search tool 16. The indexing tool operates in an off-line mode to analyze the documents at each of the sites of interest. For each document that is accessible at a given site, the tool parses the document into its constituent elements, and creates an index 18 of these elements. Typically, the constituent elements are the individual words of the document. In addition, other information from the document might also be entered into the index, for example a uniform resource locator (URL), an e-mail address, or a link to another document. Within the index, the individual elements of the documents are listed in some readily searchable form, e.g. alphabetically. Associated with each term in the index is an identification of every file which contains that term, and the information necessary to access that file, e.g. its URL. Typically, the indexing tool 14 analyzes the files at all of the sites of interest on a periodic basis, to ensure that the information in the index remains current.

As an alternative to listing each of the individual words and other terms in a document, the index created by the tool 14 may comprise a more restricted set of information, such as keywords only, headings, or merely the titles of documents.

Once the index 18 has been created, a user at a remote computer 19 can enter a query 20 which identifies the type of information that the user is interested in retrieving. Typically, the communications with the search engine running on the server 13, as well as the various information sites 10, is conducted through a browser application 21 running on the user's computer 19. The user inputs a query to the browser, which is then relayed to the search engine. In response, the search tool 16 of the engine examines the index 18 to determine whether it contains terms that match the user's query. If so, the search tool compiles a list of all of the documents containing those terms, and returns the list to the browser 21, which displays this list to the user in a suitable window 22, or the like. Preferably, the list contains sufficient information about the documents to enable the user to readily determine their possible relevance. For example, the list might contain the title of each document, its URL, and the initial text of the document.

From this displayed list, the user can select a particular document to view. By means of the browser 21, the user inputs his or her selection 24. Using the information contained in the index, e.g. the document URL, the browser accesses the site containing the document, and displays it in a new window 26 for the user to view.

Typically, the browser displays the initial content of the document, within the confines of its window. Depending upon the structure of the document, the relevance of that document to the user's inquiry may not be readily apparent from this initial view. For example, if the subject of the document is precisely on point with the user's inquiry, its title or opening paragraph may contain the exact terms specified by the user. However, if the document discusses a number of different topics, the subject matter that is related to the user's inquiry may not appear for several pages. As a result, the user is not readily apprised of the possible relevance of that document to the inquiry. If the initially displayed content of the document does not appear to match the user's interest, he or she may be inclined to move on to the next document in the list, rather than scan its contents in their entirety.

In addition to listing the files which match the user's search query, many search engines attempt to rank the files according to their possible relevance, and list the files in order of their ranking, so that those which appear to have the most relevance are listed first. One common approach to determining the relevance of documents is based upon the frequency with which the terms of the search query appear in a file. For instance, the number of times that the query term appears in the document can be divided by the total number of words in the document, to calculate a relevance ratio. All of the documents which have been determined to match the search query can then be listed in order of their relevance ratios, from highest to lowest. Alternatively, a relevance indicator might be displayed adjacent each document in the list. Since this approach to determining relevance is based upon the total content and size of a document, it does not necessarily reflect the actual relevance of the document to a particular inquiry.

Figure 2A:
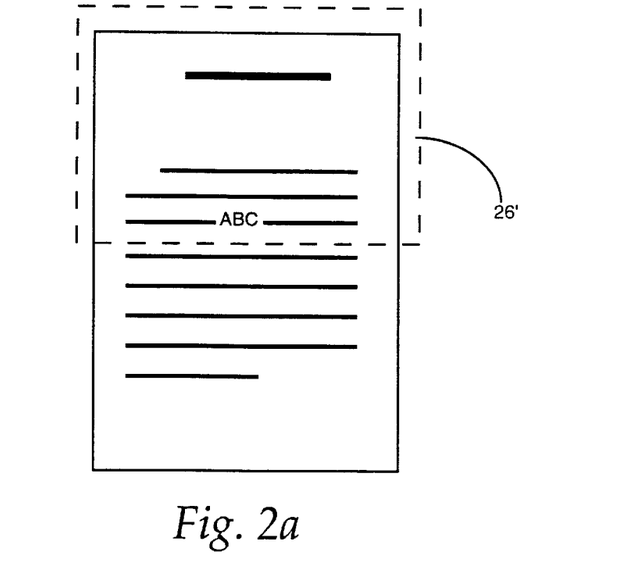
FIGS. 2a and 2b are examples of documents which contain a term that is responsive to a search query.
Figure 2B:
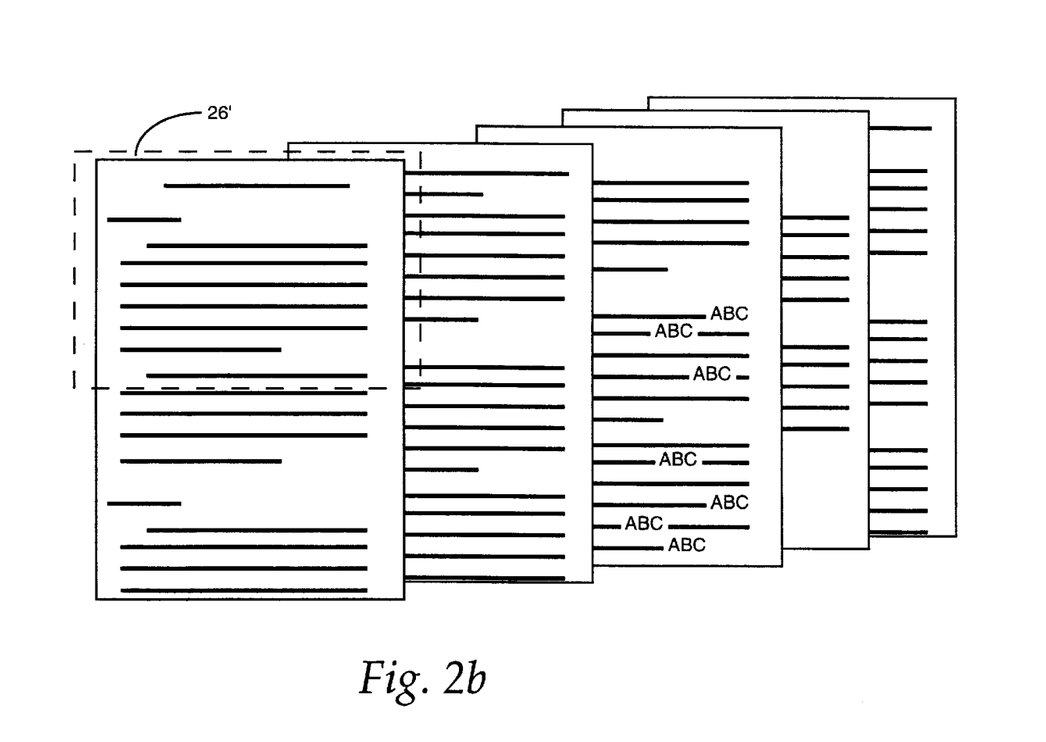

This situation is illustrated by means of an example depicted in FIGS. 2a and 2b. In this example, the user has entered the term "ABC" as the search query, and the search engine has identified two documents which match the query. The document in FIG. 2a consists of a single paragraph, in which the query term appears once. The other document is a multi-page document containing a number of articles. One of the articles is devoted entirely to the topic "ABC." The search query term appears a number of times within this article, but does not appear anywhere else in the document. If the latter document is of sufficient length, it may be the case that the relevance ratio for the document is less than that for the first document, even though it is significantly more pertinent to the user's inquiry. Furthermore, because of the location of the relevant article within the overall document, the user will not be immediately appraised of its pertinence when the document is retrieved for viewing. More particularly, the dashed rectangle 26' overlying each of the two documents illustrates the portion of the document that is initially displayed within the browser window. In the case of the first document, the user can quickly assess its content because of its short length, and determine that it may not be all that pertinent. In the case of the second document, however, the user is required to scroll through several pages before finally reaching the portion of interest. Depending upon the particular situation, many users may not take the time necessary to find the relevant portion of the document.

To alleviate these sources of possible frustration to users, as well as present the most relevant information first, the present invention enhances the search and display process, by logically dividing a single file into multiple articles, each of which can be individually searched and ranked. In the context of the present invention, an article is considered to be a contiguous portion of a document which relates to a particular topic. The segmentation of a file into multiple articles is carried out in accordance with tokens that may be contained within the file's contents itself, or in a separate file that describes the contents of the original file. In a preferred implementation of the invention, these token are provided by means of a conventional mark-up language.

Figure 3:
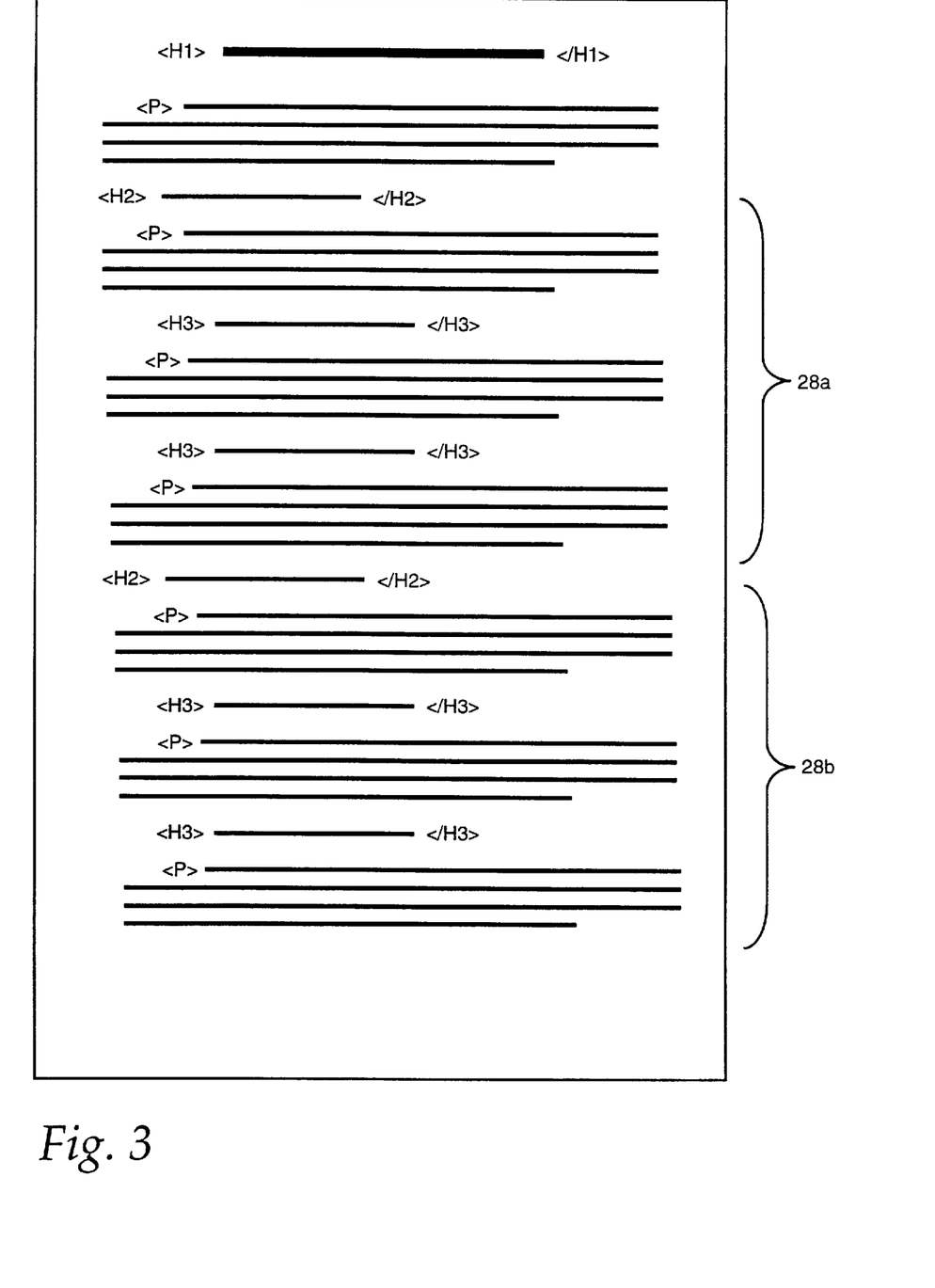
FIG. 3 is an example of a document that is segregated into articles in accordance with one embodiment of the present invention.

For example, the Hyper-Text Mark-up Language (HTML) specifies six levels of headings that can be employed within the context of a document. Typically, the highest level heading, level one, indicates the title of a document. The additional levels identify successively more detailed components in the hierarchy of a document. An example of a document which contains three levels of headings is illustrated in FIG. 3. Each heading is preceded and followed by a code word, known as a tag, which separates the heading from the other contents of the document. A second level heading, for example, is preceded by a tag having the structure <H2>, and followed by a tag of the form </H2>. In addition to headings, other types of tags embedded within the document serve to identify formatting, such as the beginnings of paragraphs, bold and italicized characters, and the like.

In accordance with the present invention, these heading tags can be employed to identify separate articles within a document. In one embodiment, every second level heading tag, <H2> is interpreted as the beginning of a new article. In the example illustrated in FIG. 3, therefore, the document contains two articles, 28a and 28b. If desired, the portion of the document which precedes the first <H2> tag, i.e., the portion above the article 28a, can also be designated as a separate article.

Within the index 18, each article is separately identified. In a preferred embodiment, the identification of the article comprises three items of data, namely the location of the file in which the article appears, the location of the beginning of the article within the file, and the length of the article. The location of the file might be designated by its URL. The beginning of the article is expressed in terms of the number of bytes from the beginning of the file. The length of the article is also expressed in terms of number of bytes.

Figure 4:
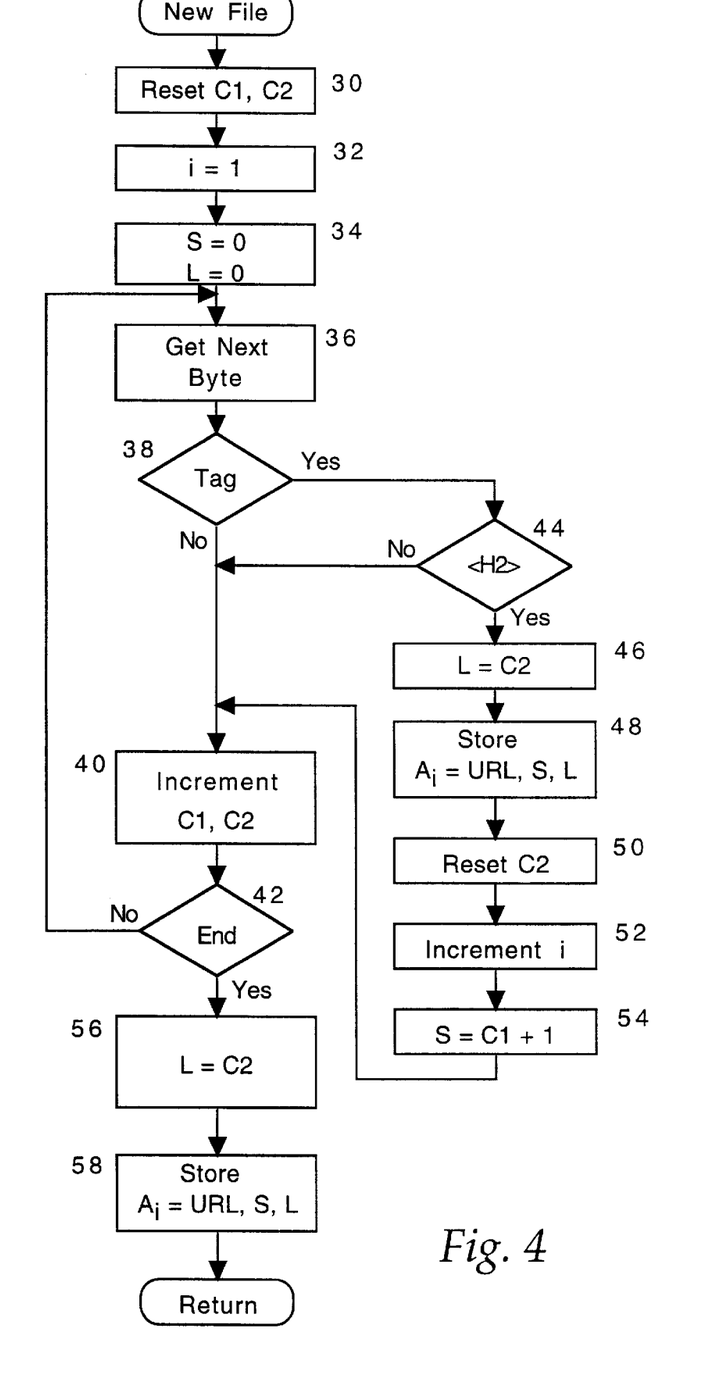
FIG. 4 is a flowchart of the operation of an indexing tool in accordance with the first embodiment of the invention.

The procedure that is carried out by the indexing tool in this embodiment, to identify the various articles, is depicted in the flowchart of FIG. 4. When a file is to be processed, a pair of counters C1, C2 are reset at step 30, and an article index i is set to a value of 1, at step 32. In addition, a start position value S and an article length value L are initially set to zero at step 34. After these initialization steps are performed, the next byte in the file, in this case the first byte, is retrieved at step 36, and is examined at step 38 to determine whether it represents a code symbol, such as a tag in an HTML document. As indicated previously, in the HTML format a tag begins with an angle bracket symbol, <. Therefore, the byte can be examined to determine whether it represents such a symbol. If not, the counters C1 and C2 are incremented at step 40, and a determination is then made at step 42 whether the end of the file has been reached. If not, the process returns to step 36, to continue counting the number of bytes in the file.

When a byte is encountered at step 38 which represents the beginning of a tag, the remainder of the tag is examined at step 44 to determine whether it is a second level heading tag, <H2>. If not, the process continues in the same manner as described above.

If a second level heading is encountered at step 44, the length value L is set to be equal to the count stored in the counter C2, at step 46. The identifier for the first article is then stored at step 48. This identifier consists of the URL for the file, the start value S and the length value L. Thereafter, the counter C2 is reset at step 50 and the article index i is incremented at step 52. The start value S for the new article, as designated by the second level heading, is set to a value equal to the contents of the counter C1, plus 1, at step 54. Thereafter, the process returns to step 40, and proceeds in the manner described above.

With this procedure, the indexing tool identifies each new article in the file, as represented by a second level heading tag. For each new article, the indexing tool determines the starting location S and length L of the article, and stores these values, together with the file's URL, as an identification of the article. Eventually, the end of the file will be detected at step 42. At this point, the count value for the counter C2 becomes the length value L for the last article, at step 56, and the identification of the last article is stored at step 58. The indexing tool then returns to its main routine, whereupon it can parse the individual words in each article, and store them in the index together with the article's identifier, in the normal manner.

By separately identifying each article within a file, and storing the associated length of the article, the determination of the article's relevance to a given inquiry can be made more meaningful to the user. In particular, the frequency of occurrence of the query terms is only evaluated in the context of the article, rather than the entirety of the file. Even if the article is only a small portion of the entire file, its particular relevance will be more appropriately identified for the user.

A particular advantage of the foregoing implementation is that it can be applied to pre-existing documents to segment them into articles, without requiring any modification of the documents themselves. In the foregoing example, the second level heading was employed as the indicator of each new article, on the assumption that a heading at this level is relatively important, such as a topic title. Accordingly, all of the text which follow such a heading can be considered to relate to that topic. Of course, if further delineation between topics is desirable, different level headings, such as third or fourth level headings, could be used instead.

As a further feature of the invention, specific identifiers can be inserted into a document to more explicitly indicate the beginning of articles. In addition, these identifiers can be employed by a browser to cause a relevant article to be immediately displayed to the user, even if it is not located at the beginning of a document.

In an embodiment of the invention which implements this latter feature, HTML comments are used to delineate the beginning and end of articles. Generally speaking, a comment is a specific type of tag that is ignored by the browser, and which enables the author of the document to insert comments that do not appear when the document is displayed or printed. In HTML, a comment tag takes the form <!--(comment)-->.

Figure 5:
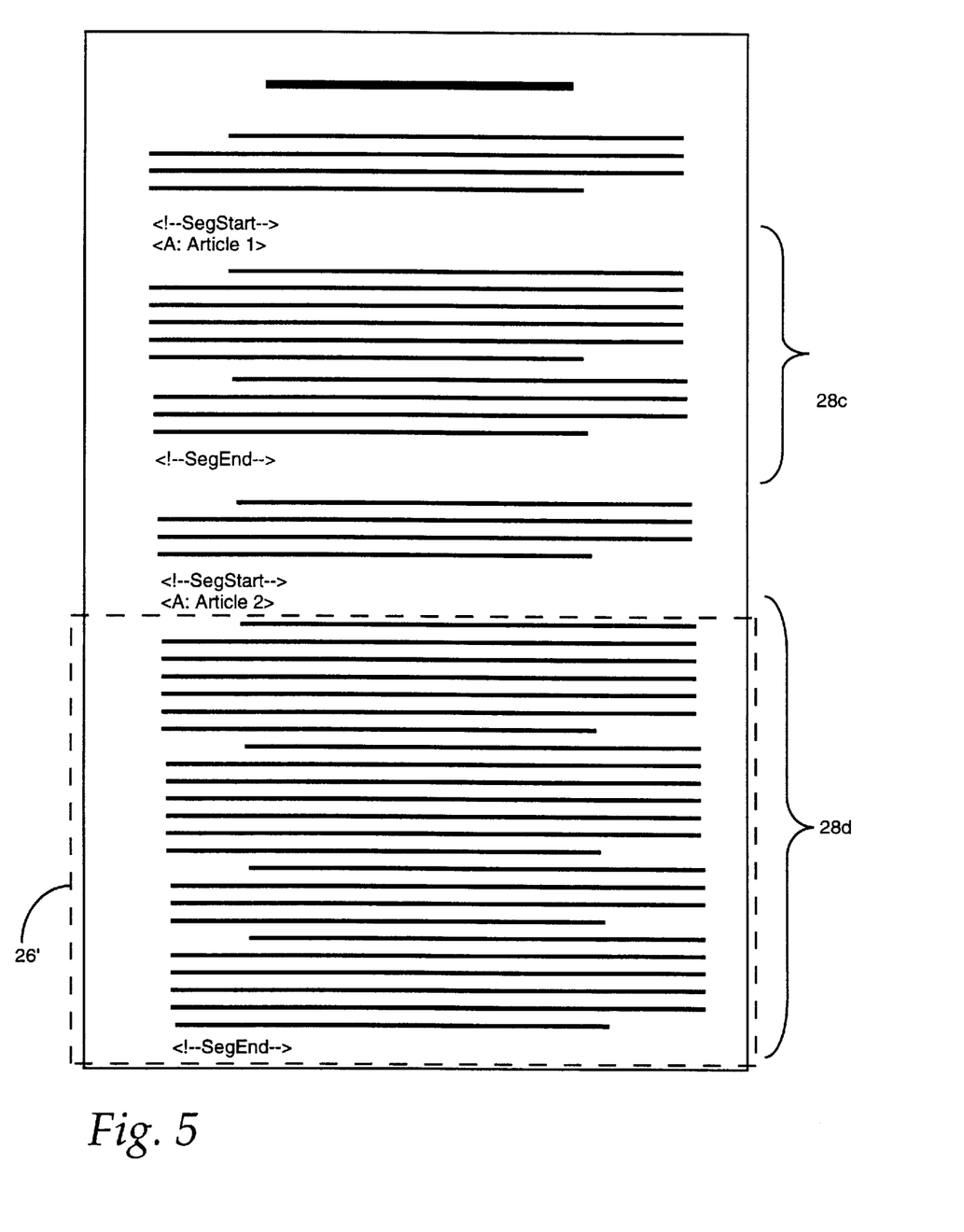
FIG. 5 is an example of a document that is segregated into multiple articles in accordance with a second embodiment of the invention.

In the context of the present invention, comment tags which contain specific types of comments can be used as the identifiers for the beginning and ending of articles within a file. For example, the beginning of an article can be identified with the comment tag <!--SegStart-->, and the end of an article can be identified with the comment tag <!--SegEnd-->. An example of an HTML document which include these types of tags to identify two separate articles 28c and 28d is illustrated in FIG. 5.

In operation, the indexing tool 14 begins by scanning a file, looking for a SegStart comment tag. Once such a tag is found, the file is searched from that point for a SegEnd comment tag. If no SegEnd comment tag is found, the end of the file is assumed to be the end of the article. If a SegEnd comment tag is located, it is used to mark the end of the article, and thereby determine its length.

Although HTML comment tags are employed in this particular example, other types of tags, as well as any other type of embedded code word, or token, which can uniquely identify the beginning and/or end of an article can be employed.

As a further feature of this embodiment, an additional type of tag, known as an anchor tag, can be associated with each article, to permit the browser to immediately navigate to the beginning of the article, regardless of where it is located within a document. In the example of FIG. 5, each anchor tag has the form <A "name">. This form of anchor creates a named location within the document, which can be referred to as part of a URL. In this implementation of the invention, the identification information that is stored for each article comprises the URL of its file and the name of the anchor. When a user selects a particular article, the browser immediately proceeds to the portion of the file that is identified by the named anchor. Thus, in the example illustrated in FIG. 5, if the user has selected the second article, the anchor tag in the index causes the browser to immediately display the portion of the file which begins at that tag, namely the beginning of the article. Consequently, it is not necessary for the user to scroll through the document in order to find the portion which may be relevant to the search inquiry.

Another advantage of this second embodiment of the invention is that the document author can be explicit about the parts of the document which contain articles. The use of comment tags, or other equivalent types of tokens, permits the author to avoid the indexing of certain passages of text which may be considered to be unimportant. Furthermore, the use of comment tags permits these types of tokens to be harmlessly interspersed within the content of the document, without adversely affecting the display or printing of the document's contents.

From the foregoing, it can be seen that the present invention provides an approach by which a file, such as a document or a web page, can be logically divided and resolved into multiple articles. Each article is capable of being individually recognized and ranked by search engines, to thereby provide the user with a more realistic appraisal of the relevance of the article to a search query. Furthermore, by associating an anchor tag, or the like, with each article, to designate a named location within a file, a browser is enabled to immediately display the relevant portion of a document, and thereby reduce the amount of time that the user must spend to look for information of interest.

It will be appreciated by those of ordinary skill in the art that the present invention can be embodied in other specific forms without departing from the spirit or essential characteristics thereof. For instance, although the illustrated embodiments of the invention have been described in the context of a search engine which indexes documents prior to conducting a search, the invention is equally applicable to real-time search engines. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for processing data files to determine their relevance to a search query, comprising the steps of:

analyzing the contents of a file to identify a token which signifies the beginning of an article within the file;

storing the location of the article within the file;

detecting the length of the article and storing the detected length; and determining the relevance of the article to a search query in accordance with its detected length.

2. The method of claim 1 wherein said file is formatted according to a mark-up language, and said token is a tag associated with said language.

3. The method of claim 2 wherein said tag identifies a particular level heading within a document.

4. The method of claim 2 wherein said tag is a comment tag.

5. The method of claim 2 wherein said token includes a first tag which identifies the beginning of an article, and a second tag which identifies a location in the file.

6. The method of claim 5 wherein the location of the file and said second tag are stored as the location of the article.

7. The method of claim 1 wherein the step of detecting the length of the article includes identifying a second token which signifies the end of the article.

8. A method for processing and identifying data files in accordance with their relevance to a search query, comprising the steps of:

analyzing the contents of a file to identify a first token which signifies the beginning of a first article within the file;

storing the location of the first article within the file;

analyzing the contents of the file to identify a second token which signifies the beginning of a second article within the file;

storing the location of the second article within the file;

determining the relevance of each article to a search query; and displaying an identification of each article that is determined to be relevant to the search query.

9. The method of claim 8 wherein said file is formatted according to a mark-up language, and said tokens are tags associated with said language.

10. The method of claim 9 wherein said tag identifies a particular level heading within a document.

11. The method of claim 9 wherein said tag is a comment tag.

12. The method of claim 9 wherein said first or said second token includes a first tag which identifies the beginning of the corresponding article, and a second tag which identifies a location in the file.

13. The method of claim 8 wherein the step of determining the relevance of each article to a search query is in accordance with the detected length of each article.

14. A method for processing data files to determine their relevance to a search query, comprising the steps of:

analyzing the contents of a file to identify a first token which signifies the beginning of an article within the file;

analyzing the contents of the file to identify a second token which signifies the end of the article within the file;

detecting the length of the article from said first and second tokens; and determining the relevance of the article to a search query in accordance with its detected length.

15. The method of claim 14 wherein said file is formatted according to a mark-up language, and said tokens are tags associated with said language.

16. The method of claim 15 wherein said tags are comment tags.

17. The method of claim 15 wherein said first token includes a first tag which identifies the beginning of an article, and a second tag which identifies a location in the file.

18. A computer readable medium containing a program which executes the steps of:

analyzing the contents of a file to identify a token which signifies the beginning of an article within the file;

storing the location of the article within the file;

detecting the length of the article and storing the detected length; and determining the relevance of the article to a search query in accordance with its detected length.

19. The computer readable medium of claim 18 wherein the step of detecting the length of the article includes identifying a second token which signifies the end of the article.

20. A computer readable medium containing a program which executes the steps of:

analyzing the contents of a file to identify a first token which signifies the beginning of a first article within the file;

storing the location of the first article within the file;

analyzing the contents of the file to identify a second token which signifies the beginning of a second article within the file;

storing the location of the second article within the file;

determining the relevance of each article to a search query; and displaying an identification of each article that is determined to be relevant to the search query.

21. A computer readable medium containing a program which executes the steps of:

analyzing the contents of a file to identify a first token which signifies the beginning of an article within the file;

analyzing the contents of the file to identify a second token which signifies the end of the article within the file;

detecting the length of the article from said first and second tokens; and determining the relevance of the article to a search query in accordance with its detected length.

* * * * *